(12) United States Patent
Qiu et al.

(10) Patent No.: US 6,980,627 B2
(45) Date of Patent: Dec. 27, 2005

(54) DEVICES AND METHODS FOR PRODUCING MULTIPLE X-RAY BEAMS FROM MULTIPLE LOCATIONS

(75) Inventors: Qi Qiu, Chapel Hill, NC (US); Jianping Lu, Chapel Hill, NC (US); Otto Z. Zhou, Chapel Hill, NC (US)

(73) Assignee: Xintek, Inc., Research Triangle Park, NC (US)

( * ) Notice: Subject to any disclaimer, the term of this patent is extended or adjusted under 35 U.S.C. 154(b) by 143 days.

(21) Appl. No.: 10/614,787

(22) Filed: Jul. 9, 2003

(65) Prior Publication Data

US 2004/0114721 A1 Jun. 17, 2004

Related U.S. Application Data

(63) Continuation-in-part of application No. 10/309,126, filed on Dec. 4, 2002, which is a continuation of application No. 09/679,303, filed on Oct. 6, 2000, now Pat. No. 6,553,096, and a continuation of application No. 10/448,144, filed on May 30, 2003.

(51) Int. Cl.[7] .............................................. H01J 35/06
(52) U.S. Cl. ...................................... 378/122; 378/136
(58) Field of Search ................................ 378/122, 119, 378/134, 136, 124; 313/495, 351, 309

(56) References Cited

U.S. PATENT DOCUMENTS

| | | | |
|---|---|---|---|
| 4,712,226 A | * 12/1987 | Horbaschek | ................. 378/134 |
| 4,809,308 A | 2/1989 | Adams et al. | |
| 4,926,452 A | 5/1990 | Baker et al. | |
| 5,594,770 A | 1/1997 | Bowles et al. | |
| 5,773,921 A | * 6/1998 | Keesmann et al. | .......... 313/309 |
| 6,028,911 A | * 2/2000 | Kawahara | ..................... 378/44 |
| 6,057,637 A | 5/2000 | Zettl et al. | |
| 6,277,318 B1 | 8/2001 | Bower et al. | |
| 6,333,968 B1 | * 12/2001 | Whitlock et al. | ............ 378/136 |
| 6,334,939 B1 | 1/2002 | Zhou et al. | |
| 6,385,292 B1 | 5/2002 | Dunham et al. | |
| 6,456,691 B2 | 9/2002 | Takahashi et al. | |
| 6,498,349 B1 | 12/2002 | Thomas et al. | |
| 6,553,096 B1 | 4/2003 | Zhou et al. | |
| RE38,223 E | 8/2003 | Keesmann et al. | |
| 6,630,772 B1 | 10/2003 | Bower et al. | |
| 6,650,730 B2 | 11/2003 | Bogatu et al. | |
| 6,674,837 B1 | 1/2004 | Taskar et al. | |
| RE38,561 E | 8/2004 | Keesmann et al. | |
| 6,850,595 B2 | 2/2005 | Zhou et al. | |
| 6,852,973 B2 | 2/2005 | Suzuki et al. | |
| 2002/0085674 A1 | 7/2002 | Price et al. | |
| 2002/0094064 A1 | 7/2002 | Zhou et al. | |
| 2002/0140336 A1 | 10/2002 | Stoner et al. | |
| 2003/0198318 A1 | 10/2003 | Price et al. | |
| 2004/0028183 A1 | 2/2004 | Lu et al. | |
| 2004/0036402 A1 | 2/2004 | Keesmann et al. | |
| 2004/0114721 A1 | 6/2004 | Qiu et al. | |
| 2004/0240616 A1 | 12/2004 | Qiu et al. | |
| 2004/0256975 A1 | 12/2004 | Gao et al. | |

OTHER PUBLICATIONS

U.S. Appl. No. 09/351,537, filed Jul. 1, 1999, Bower et al.
U.S. Appl. No. 10/358,160, filed Feb. 5, 2003, Lu et al.
U.S. Appl. No. 10/464,440, filed Jun. 19, 2003, Gao.

* cited by examiner

*Primary Examiner*—David V. Bruce
*Assistant Examiner*—Hoon Song
(74) *Attorney, Agent, or Firm*—Burns, Doane, Swecker & Mathis, LLP

(57) ABSTRACT

An x-ray generating device includes at least one field-emission cold cathode having a substrate and incorporating nanostructure-containing material including carbon nanotubes. The device further includes at least one anode target. Associated methods are also described.

51 Claims, 15 Drawing Sheets

DEVICES AND METHODS FOR PRODUCING MULTIPLE X-RAY BEAMS FROM MULTIPLE LOCATIONS

The present application is a Continuation-in-Part of co-pending U.S. patent application Ser. No. 10/309,126 filed on Dec. 4, 2002, which is a Continuation of U.S. patent application Ser. No. 09/679,303 filed on Oct. 6, 2000, now U.S. Pat. No. 6,553,096. The present application is also a Continuation of U.S. patent application Ser. No. 10/448,144, filed on May 30, 2003.

FIELD OF THE INVENTION

The present invention is directed to devices and techniques for producing a plurality of X-ray beams from multiple locations. For example, methods and devices using a field emission cathode with a plurality of individually addressable electron-emitting pixels are contemplated. Electrons emitted from the pixels can be directed towards different focal points on the anode, thus producing multiple x-ray beams from multiple locations of the same device.

BACKGROUND OF THE INVENTION

Various constructions and techniques will be described below. However, nothing described herein should be construed as an admission of prior art. To the contrary, Applicants expressly preserve the right to demonstrate, where appropriate, that anything described herein does not qualify as prior art under the applicable statutory provisions.

Conventional x-ray tubes comprise a cathode, an anode and a vacuum housing. The cathode is a negative electrode that delivers electrons towards the positive anode. The anode attracts and accelerates the electrons through the electric field applied between the anode and cathode. The anode is typically made of metals such as tungsten, molybdenum, palladium, silver and copper. When the electrons bombard the target most of their energy is converted to thermal energy. A small portion of the energy is transformed into x-ray photons radiated from the target, forming the x-ray beam. The cathode and the anode are sealed in an evacuated chamber which includes an x-ray transparent window typically composed of low atomic number elements such as Be.

X-ray tubes are widely used for industrial and medical imaging and treatment applications. All x-ray imaging is based on the fact that different materials have different x-ray absorption coefficients. Conventional x-ray imaging techniques produce a 2-dimensional projection of a 3 dimensional object. In such process the special resolution along the x-ray beam direction is lost.

Although also based on the variable absorption of x-rays by different materials, computed tomography (CT) imaging, also known as "CAT scanning" (Computerized Axial Tomography), provides a different form of imaging known as cross-sectional imaging. A CT imaging system produces cross-sectional images or "slices" of an object. By collecting a series of projection images of the same object from different viewing angles, a 3-D image of the object can be reconstructed to reveal the internal structure to a certain resolution. Today CT technology is widely used for medical diagnostic testing, industrial non-destructive testing for example for inspection of semiconductor printed circuit boards (PCBs), explosive detection, and airport security scans.

In the semiconductor industry, the features on printed circuit boards are becoming smaller, and circuits with multi-layer architectures are becoming more common. There is an increasing demand for machines that can perform 3-D inspection at rapid speed. The most common medical CT scanners today use one x-ray tube that rotates around the patient and in the process takes hundreds of projection images necessary for re-constructing one slice image. The x-ray tube used in the medical CT scanners has a single electron emitting cathode and a single focal spot. For industrial inspection and in particular for PCB inspection, only a small number of projection images are taken from a narrow range of viewing angles. For this special purpose, several devices have been developed to generate multiple x-ray beams from multiple focal points on the anode surface. The purpose is to produce multiple projection images with different viewing angles without mechanically moving the x-ray tube. Such devices are all based on a thermionic cathode that produces the electrons. The electrons produced from the same cathode are steered to different points of the anode by complicated electrical and magnetic devices built inside the x-ray tube. This type of device is generally illustrated in FIG. 1. This device 1000 includes a thermionic cathode 1002 that emits a beam of electrons e which pass through an arrangement of focus and steering coils 1004, 1006, thereby directing the electron beam e onto different locations of an anode surface 1008 having multiple x-ray emitting focal points that produce x-rays 1010.

Another apparatus is described, for example, in U.S. Pat. No. 5,594,770 and includes an x-ray source having a cathode for producing a steerable electron beam. A controller directs the electron beam to predetermined locations on a target anode. The user may flexibly select appropriate predetermined positions. A detector receives x-rays that are transmitted through the test object from each of the predetermined locations, and produces images corresponding to each of the predetermined locations. The images are digitized and maybe combined to produce an image of a region of interest. Alternatively, as described in U.S. Pat. Nos. 4,926,452 and 4,809,308, an electron beam is deflected in a circular scan pattern onto the tube anode in synchronization with a rotating detector that converts the x-ray shadow-graph into an optical image which is converted and viewed on a stationary video screen. A computer system controls an automated positioning system that supports the item under inspection and moves successive areas of interest into view. In order to maintain high image quality, a computer system also controls the synchronization of the electron beam deflection and rotating optical system, making adjustments for inaccuracies of the mechanics of the system. Such a device is generally illustrated in FIG. 2. The illustrative device 2000 includes a thermionic electron beam source 2002 which generates an electron beam e that passes through an arrangement of focus coils 2004, 2006 that direct the beam onto a tube angle 2008, thereby generating a pattern of x-rays 2010.

A third way to get x-ray beams emanating from different angles is to mechanically rotate a single beam x-ray tube/source, as schematically illustrated in FIG. 3.

Although the above listed techniques can serve the purpose, these single electron beam based x-ray inspection have several drawbacks related to limitations in resolution, limited viewing angles, cost and efficiency. These prior devices and techniques suffer from a common drawback in that they all rely on one single source of electrons to generate x-rays and obtain multiple images of the PCBs from different angles. Thus, inherently they are slow and cannot simultaneously generate multiple images of the object under inspection from different angles. In addition, they all require mechanical motion of either the x-ray source or the x-ray detector, which will lead to inconsistency in x-ray focus spot size and imaging quality. Furthermore, these x-ray systems all rely on thermionic electron emitters which are sensitive to temperature, require long warm up time, and can not turn on/off easily, thus they can not be easily programmed and waste large amount energy and x-ray system lifetime.

The concept of field-emission x-ray tubes has been investigated. In such devices a field emission cathode replaces the thermionic filament. Electron field emission can be accomplished via a simple diode mode where a bias voltage is applied between the target and the cathode. Electrons are emitted from the cathode when the electrical field exceeds the threshold field for emission. A triode construction can also be employed wherein a gate electrode is placed very close to the cathode. In such configurations, electrons are extracted by applying a bias field between gate electrode and the cathode. The field-emitted electrons are then accelerated by a high voltage between the gate and the anode. Here the electron current and energy are controlled separately.

Recently discovered carbon nanotubes have larger field enhancement factors (β), thus lower threshold fields for emission are required relative to conventional emitters such as Spindt-type tips. Carbon nanotubes are stable at high currents. A stable emission current of 1 $\mu$A or greater has been observed from an individual single-walled carbon nanotube and an emission current density greater than 1 A/cm$^2$ from a macroscopic cathode containing such material, has been reported. Carbon nanotubes are also thermally stable and chemically inert. These properties make carbon nanotubes attractive electron field emitters for field emission x-ray devices.

FIG. 4 and its inset show the typical emission current-voltage characteristics of a CNT cathode. It shows the classic Fowler-Nordheim behavior with a threshold field of 2 V/$\mu$m for 1 mA/cm$^2$ current density. Emission current density over 1 $\mu$A/cm$^2$ was readily achieved. Field emitted electrons from carbon nanotubes have a very narrow energy and spatial distribution. The energy spread is about 0.5 eV and the spatial spread angle in the direction parallel to the electrical field is 2–5° degree half angle. The potential of using carbon nanotubes as a cold-cathode has been demonstrated in devices such as the field emission flat panel displays (FEDs), lighting elements, and discharge tubes for over-voltage protection.

U.S. Pat. No. 6,630,772 entitled "Device Comprising Carbon Nanotube Field Emitter Structure and Process for Forming Device", the disclosure of which is incorporated herein by reference, in its entirety, discloses a carbon nanotube-based electron emitter structure.

U.S. Pat. No. 6,553,096 entitled "X-Ray Generating Mechanism Using Electron Field Emission Cathode", the disclosure of which is incorporated herein by reference, in its entirety, discloses an x-ray generating device incorporating a cathode formed at least in part with a nanostructure-containing material.

U.S. Patent Application Publication No. US-2002/0094064, entitled "Large-Area Individually Addressable Multi-Beam X-Ray System and Method of Forming Same", the disclosure of which is incorporated herein by reference, in its entirety, discloses structures and techniques for generating x-rays which includes a plurality of stationary and individually electrically addressable field emissive electron sources.

U.S. Patent Application Publication No. US 2004-0028183 entitled "Method and Apparatus for Controlling Electron Beam Current", the disclosure of which is incorporated herein by reference, in its entirety, discloses an x-ray generating device which allows independent control of the electron emission current by piezoelectric, thermal, or optical means.

U.S. Patent Application Publication No. US 2002/0140336, entitled "Coated Electrode with Enhanced Electron Emission and Ignition Characteristics", the disclosure of which is incorporated herein by reference, in its entirety, discloses a coated electrode construction which incorporates nanostructure-containing materials.

U.S. Pat. No. 6,334,939 entitled "Nano-Material Based Electron Field Emission Cathodes for Vacuum and Gaseous Electronics", the disclosure of which is incorporated herein by reference, in its entirety, discloses electronics incorporating field emission cathodes based at least in part on nanostructure-containing materials.

U.S. Pat. No. 6,385,292 entitled "Solid State CT System and Method", the disclosure of which is incorporated herein by reference, in its entirety, disclose an x-ray source including a cathode formed from a plurality of addressable elements.

U.S. Patent Application Publication No. US-2002/0085674 entitled "Radiography Device With Flat Panel X-Ray Source", the disclosure of which is incorporated herein by reference, in its entirety, discloses a radiography system having a solid state x-ray source that includes a substrate with a cathode disposed thereon within a vacuum chamber.

U.S. Pat. No. 6,385,292 entitled "X-Ray Generator", the disclosure of which is incorporated herein by reference, in its entirety, discloses an x-ray generator which includes a cold field-emission cathode. The emissive current of the cathode can be controlled by various means.

Thus, it is highly desirable to have an x-ray imaging system which can generate multiple beams of x-ray simultaneously from different positions and radiation angles. Utilizing nanostructure-containing field emissive cathodes, the present invention provides methods and apparatus for making such multi-beam x-ray imaging systems, and techniques for their use.

SUMMARY OF THE INVENTION

According to the present invention, devices and techniques are provided that are more efficient in producing multi-beam x-rays, provide more flexible controllability and are equipped with highly integrated multiple functions. According to the present invention, an x-ray source that can provide x-ray beams shooting to the scanned objects from different angles is provided.

Apparatus for making non-destructive x-ray measurements are also provided. The apparatus includes single or multiple field emission cold cathodes. The electrons generated from the nanostructure-containing cold cathodes will be accelerated to certain desired sites in the target anode therefore to generate x-rays beam from different angles respective to the scanned object. Detectors will be used to collect the x-rays transmitted through the scanned objects to form images from different angles. The images can be used to reconstruct a 2-D or 3-D images revealing the internal structure of the object.

According to the present invention, a field emission cathode which comprises nanostructure materials is used in the x-ray tubes as electron source for generating x-rays in this invention. This new x-ray generation mechanism provides many advantages over the conventional thermionic based x-ray source in the sense of eliminating the heating element, operating at room temperature, generating pulsed x-ray radiation in a high repetition rate and making multi-beam x-ray source and portable x-ray devices possible.

According to a first aspect, the present invention provides an x-ray generating device for scanning an object under inspection comprising: at least one addressable field emission cathode, the cathode comprising a substrate and a nanostructure-containing material comprising carbon nanotubes; and at least one anode target; wherein the device lacks a heater for the cathode.

DETAILED DESCRIPTION OF THE INVENTION

Figure 1:
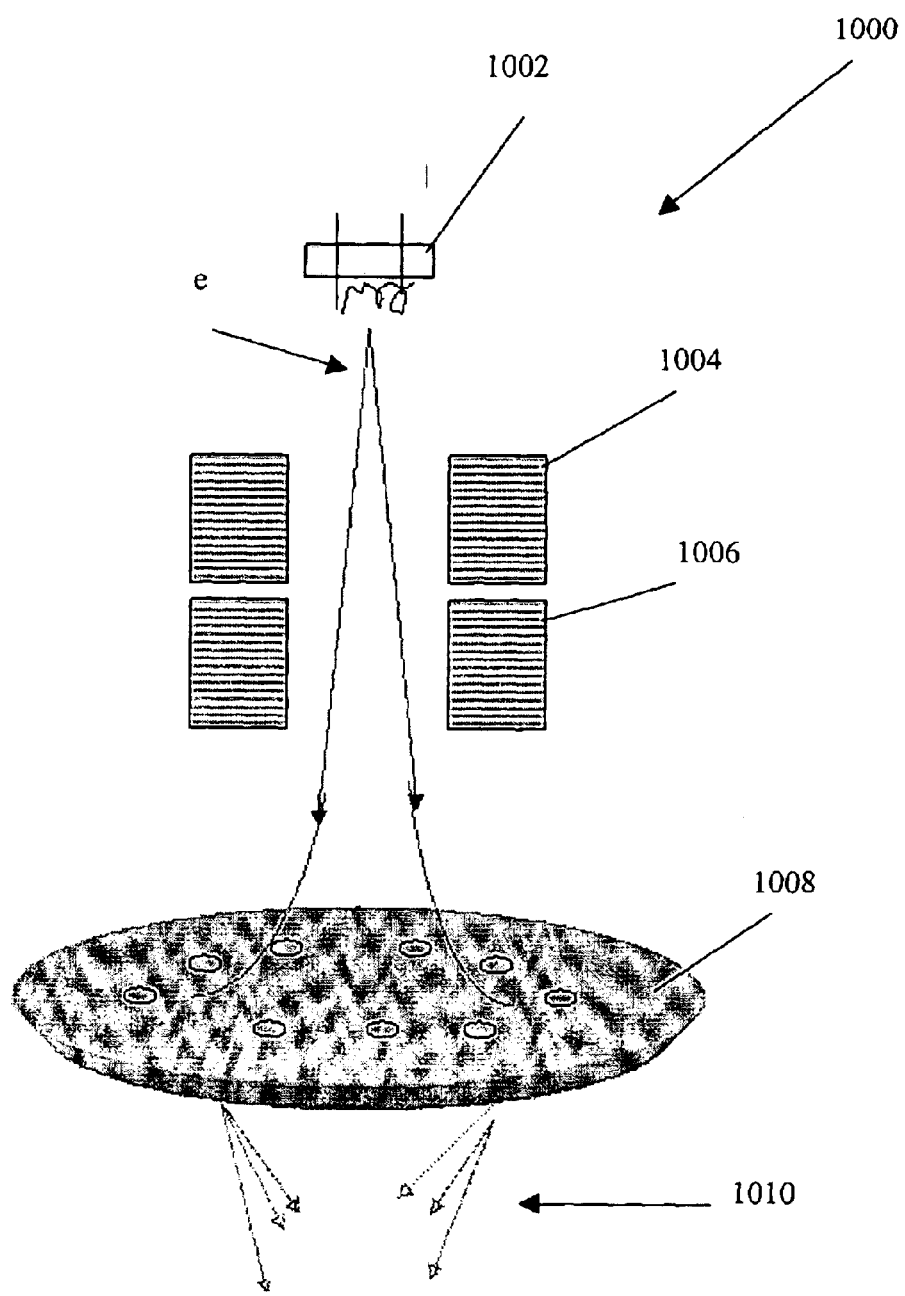
FIG. 1 is a schematic illustration of a known configuration and technique for manipulating an electron beam to form plurality of x-rays.
Figure 2:
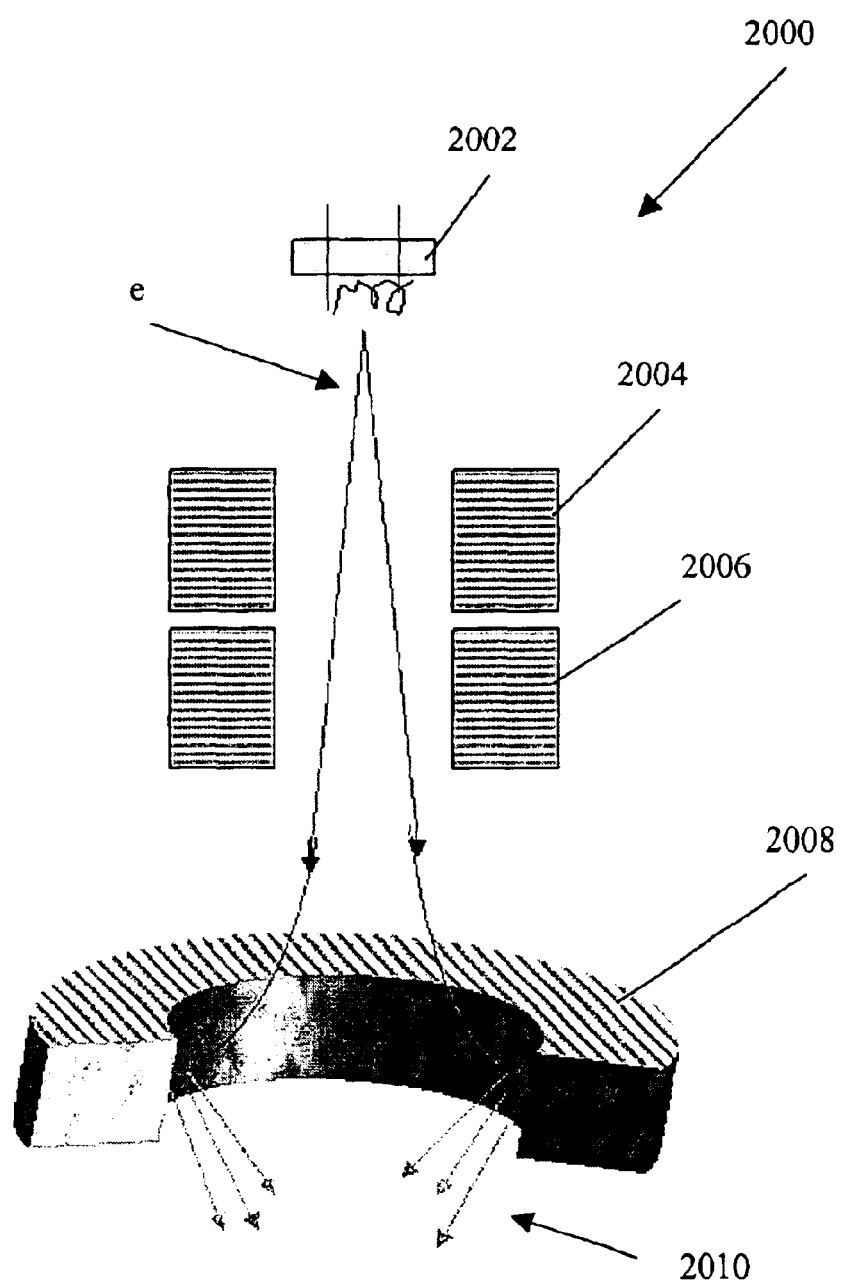
FIG. 2 is a schematic illustration of another known technique and construction for manipulation of an electron beam to produce a plurality of x-rays.
Figure 3:
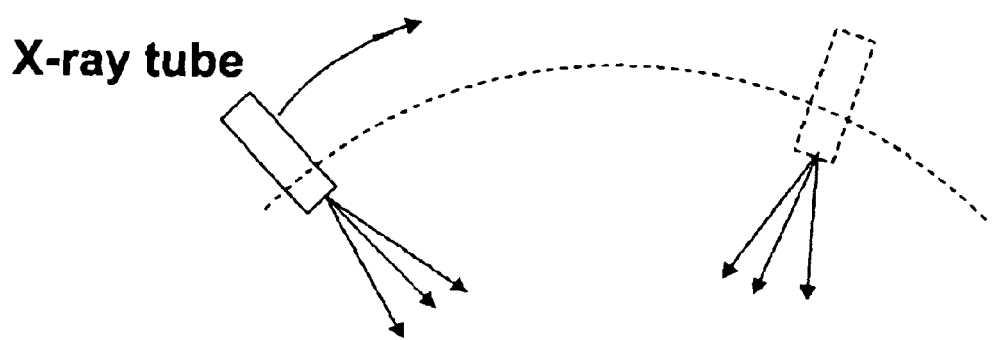
FIG. 3 is yet another schematic illustration of a known arrangement and technique for scanning an object with x-rays provided at multiple angles relative thereto.
Figure 4:
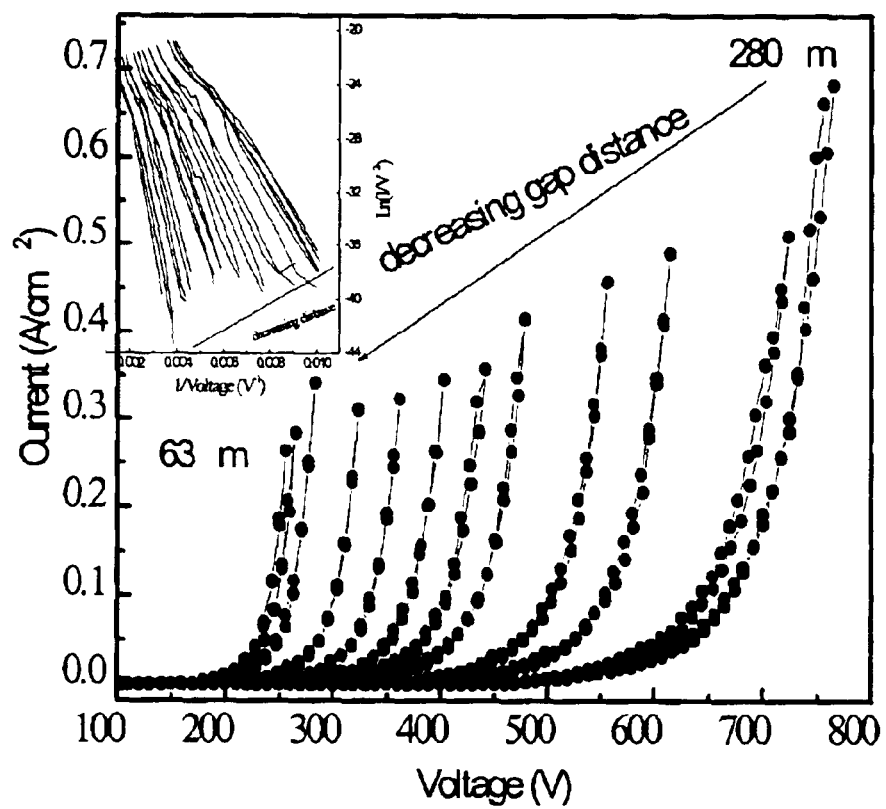
FIG. 4 is a plot of current versus voltage behavior for a carbon-nanotube-based cathode.

Exemplary arrangements and techniques according to the present invention will now be described by reference to the drawing figures.

Figure 5:
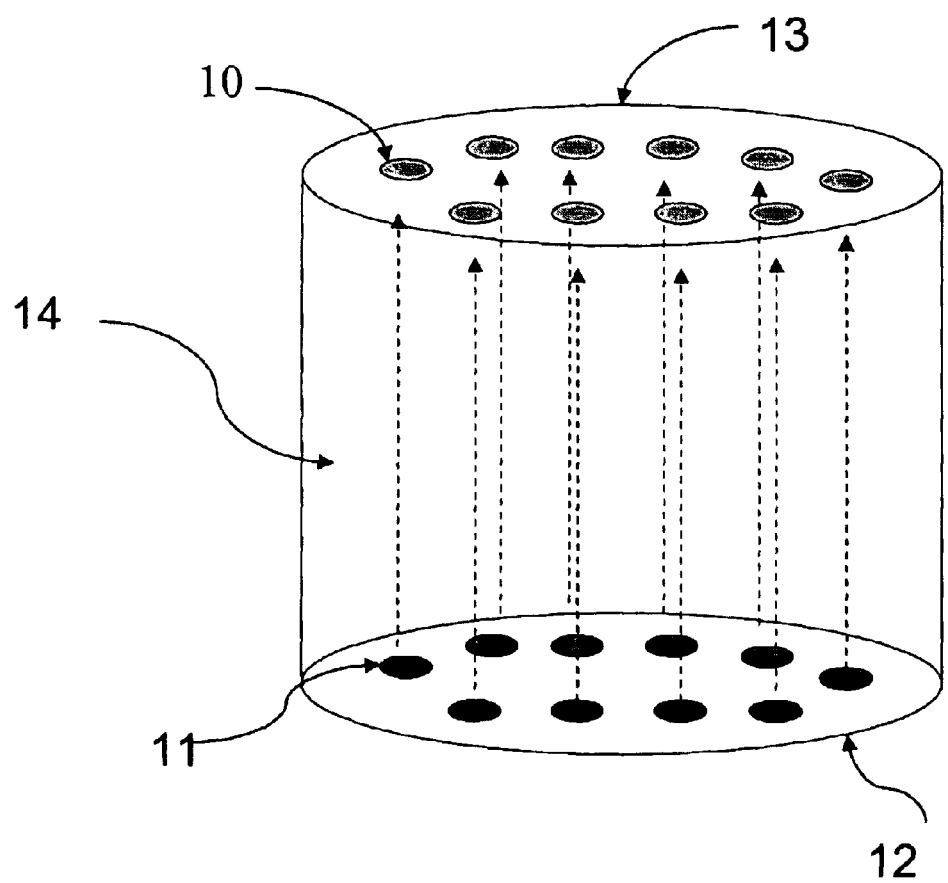
FIG. 5 is a schematic illustration of an x-ray source with multiple stationary electron sources formed according to the principles of the present invention.
Figure 6:
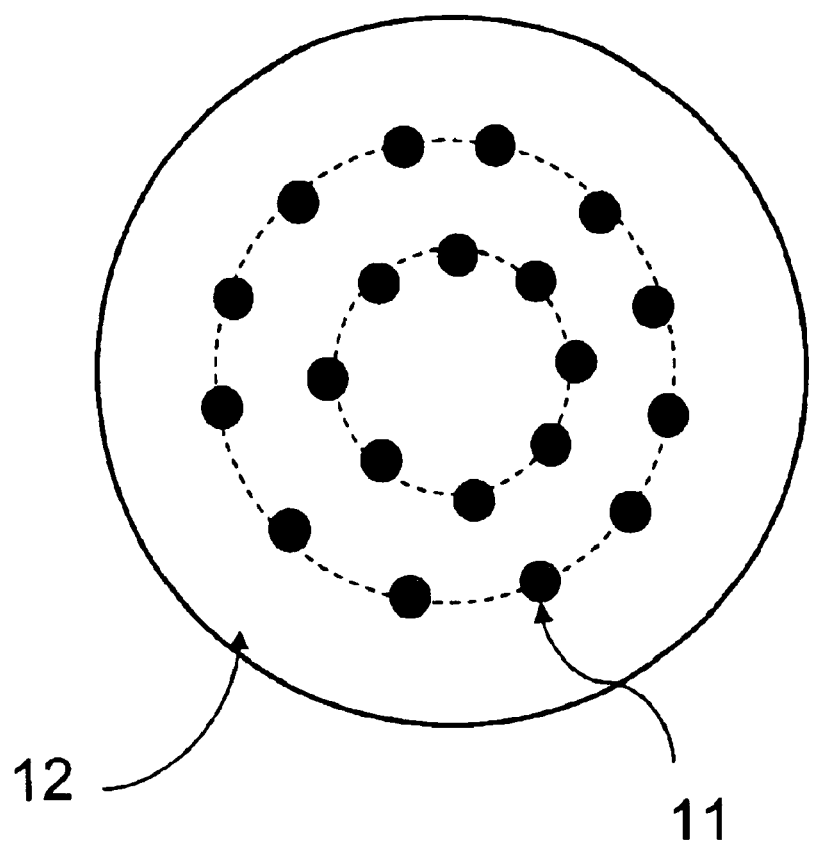
FIG. 6 is a bottom view of the configuration illustrated in FIG. 5.

According to one embodiment of the invention, as illustrated in FIG. 5, an x-ray source comprises a field emission cathode 12 with multiple individually-addressable electron-emitting elements or "pixels" 11. The cathode 12 has a planar geometry as shown in FIG. 6. The anode 13 is opposing and is separated from the cathode 12 by a finite gap distance within a vacuum chamber 14. Electron emission from the pixels 11 on the cathode can be controlled by a gate electrode. Details of possible gate electrode constructions and arrangements that can be utilized in this embodiment, and others, are described in later portions of the disclosure. The x-ray source may comprise a single gate electrode or more preferably a gate electrode with a plurality of individually addressable units, each unit controls a corresponding pixel 11 on the cathode 12. Electrons are extracted from an emission pixel 11 when the applied an electrical field between the said pixel 11 and its corresponding controlling unit on the gate electrode exceeds a threshold value. A high voltage is applied between the cathode 12 and anode 13. When an individual pixel 11 is turned on, the emitted electron beam is accelerated by the high tension electrical field to gain enough kinetic energy and bombard a corresponding point on the anode 13. The anode 13 could be made of any suitable material such as copper, tungsten, molybdenum, or an alloy of different metals. X-ray is produced from the anode at the point the electrons impinge, or a so-called "focal spot."

The anode 13 comprises a plurality of discrete focal spots 10 wherein each focal spot comprises a different material with a different atomic number or a different alloy; wherein each focal spot 10 produces x ray with a different energy distribution when bombarded with the emitted electrons.

In the illustrated embodiment, the x-ray focal points 10 on the anode 13 have a one-to-one relationship with the electron emitting pixels 11 on the cathode 12. So when a pixel 11 is turned on, an x-ray beam is generated from the corresponding spot on the anode 13. Therefore by turning on the pixels 11 at different positions will generate x-ray beams from different focal points 10 on the anode 13. As a result, for imaging purpose, x-ray beams from different viewing angles are realized without physical motion of the x-ray generating device. The pixels at different positions can be programmed and controlled by computer to be turned on in a sequence, in certain frequency, duty cycle, and dwell time.

The cathode 12 can have a plurality of emission pixels 11 arranged in any pre-determined pattern. In one particular embodiment, the emission pixels 11 are arranged along the circumference of a circle with a finite diameter as illustrated in FIG. 6. The electrons emitted from each pixel 11 can be directed towards a corresponding focal spot 10 on the anode 13, wherein the focal spots 10 on the anode 13 are positioned along the circumference of a circle, wherein each focal spot 10 corresponds to a field emission pixel 11 on the cathode.

A cathode constructed according to the principles of the present invention preferably incorporates a field-emissive material. More preferably, a cathode formed according to the principles of the present invention incorporates a nanostructure-containing material. The term "nanostructure" material is used by those familiar with the art to designate materials including nanoparticles such as $C_{60}$ fullerenes, fullerene-type concentric graphitic particles, metal, compound semiconductors such as CdSe, InP, nanowires/nanorods such as Si, Ge, $SiO_x$, Ge, $O_x$, or nanotubes composed of either single or multiple elements such as carbon, $B_xN_y$, $C_x$, $B_y$, $N_z$, $MoS_2$, and $WS_2$. One of the common features of nanostructure materials is their basic building blocks. A single nanoparticle or a carbon nanotube has a dimension that is less than 500 nm in at least one direction. The term "nanostructure-containing" is intended to encompass materials which are composed entirely, or almost entirely of nanostructure materials, as well as materials composed of both nanostructures as well as other types of materials, thereby forming a composite construction. A cathode formed according to the principles of the present invention can be formed entirely of the above-described nanostructure-containing materials. Alternatively, the cathode may comprise a substrate or base material, which is then provided with the one or more coating layers which include the above-described nanostructure-containing materials. The nanostructure-containing material coating may be applied directly to the cathode substrate material surface. Alternatively, an intervening adhesion-promoting layer may also be provided. According to an illustrative, embodiment, the cathode formed according to the principles of the present invention is formed, at least in part, from a high-purity material comprising single-walled carbon nanotubes, double-walled carbon nanotubes, multi-walled carbon nanotubes or mixtures thereof.

Figure 7:
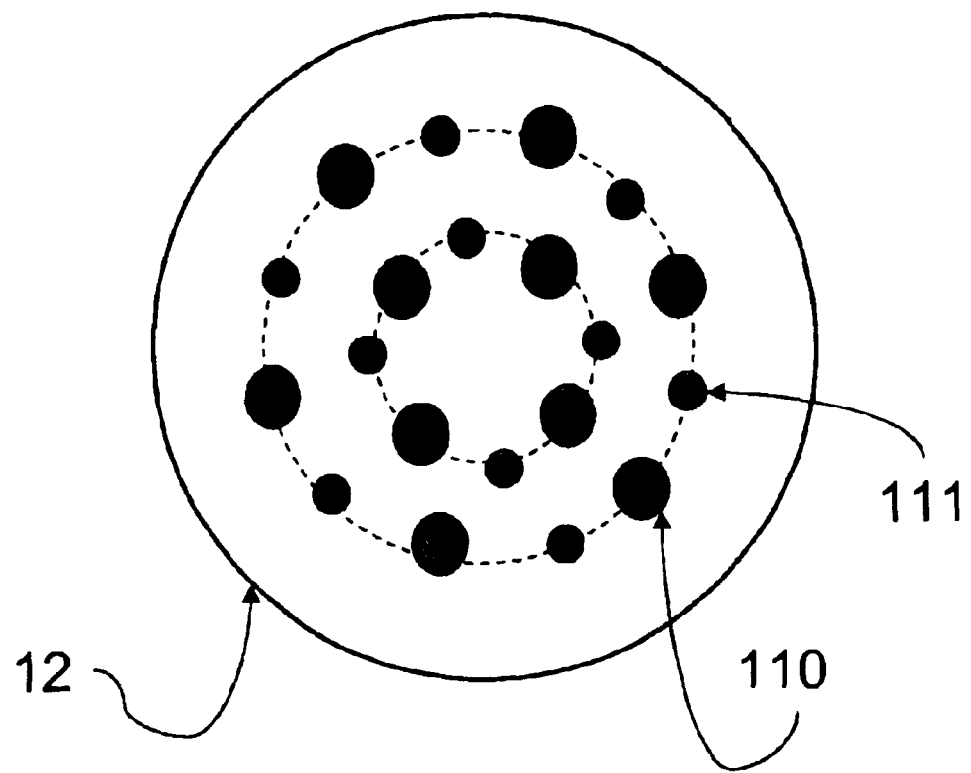
FIG. 7 is a bottom view of an alternative embodiment for producing x-rays with multiple electron sources, formed according to another aspect of the present invention.

In some applications, high x-ray flux is needed and the focal spot size is not important, in such cases, a pixel with a bigger emission area which can produce higher current is desired. One can prepare the pixels with different sized emission areas 110, 111 as shown in FIG. 7. In this way, a multifunctional x-ray source can be achieved. The emission area of each field emission pixel 110, 111 varies according to a predetermined pattern, wherein under the same applied electrical field the total emission current from each pixel is commensurate with the emission area of the pixel, wherein a scanning x-ray beam with programmable intensity from each focal spot is achieved by applying the electrical field with the same amplitude to each pixel. As shown in FIG. 7, the emission areas of field emission pixel set 111 and field emission pixel set 110 are different. In the event that a high x-ray intensity is desired, with the applied electrical field remaining unchanged, field emission pixel set 110 is used.

Figure 8:
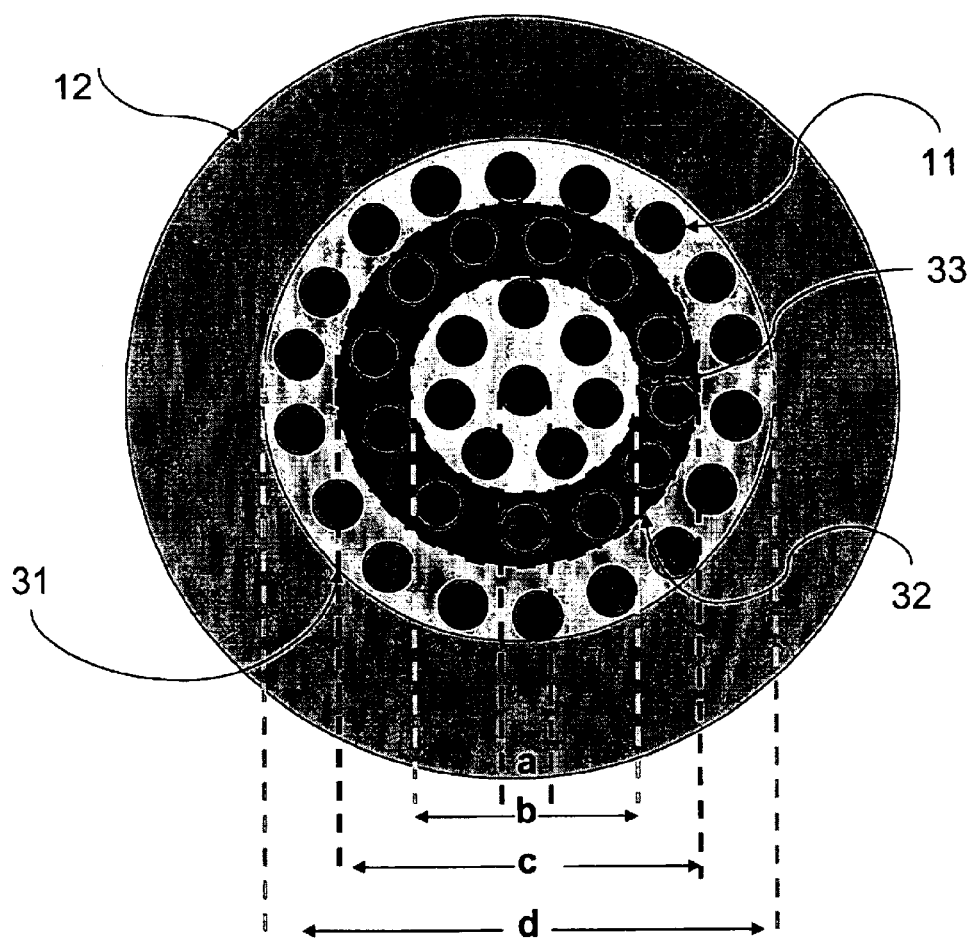
FIG. 8 is a bottom view schematically illustrating yet another alternative arrangement of multiple electron emission sources according to yet another aspect of the present invention.
Figure 9:
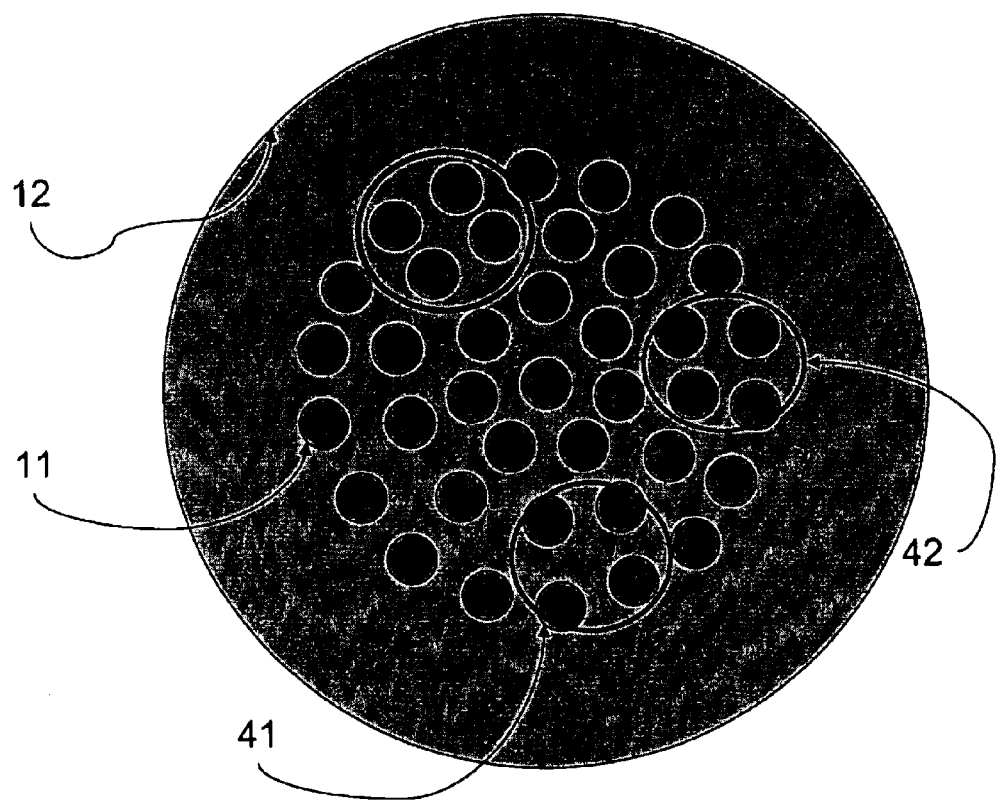
FIG. 9 is also a bottom or planar view of a further alternative embodiment formed according to the principles of the present invention.

According to alternative constructions, as illustrated in FIGS. 8 and 9, a plurality of field emission pixels 11 on the cathode 12 are arranged into a predetermined pattern, and are programmed into groups of emission units wherein each emission unit comprises a sub-set 31, 32 and 33 of emission pixels with different diameters b, c and d (FIG. 8), or form clusters 41, 42 (FIG. 9), wherein electrons emitted from each emission unit are directed towards corresponding focal spots on the anode. The focal spots on the anode can be positioned according to the same pattern as the emission units on the cathode.

Figure 10:
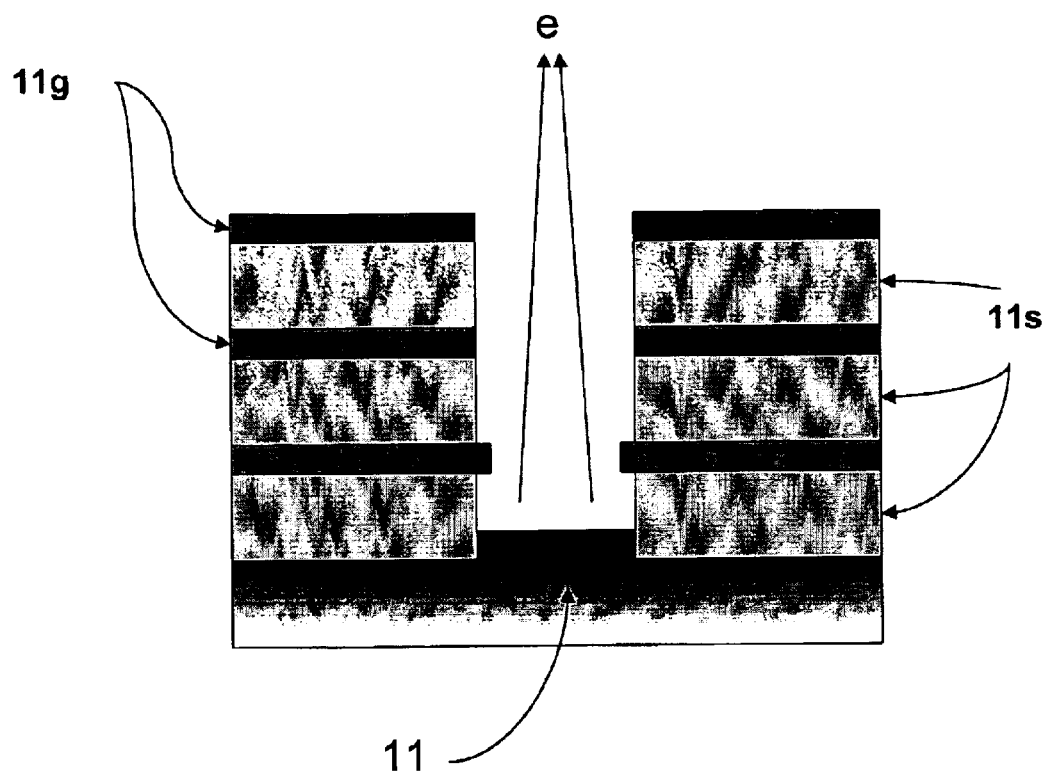
FIG. 10 is a schematic illustration of electron emission source, or pixel, provided with a multilayer gated construction formed according to the principles of the present invention.

To focus the electron beam extracted from each pixel 11, multi-layer electrical gates or coils 11g separated by insulator layers 11s can be built on top of each pixel 11 in the path of the electron beam "e" as shown in FIG. 10. When appropriate voltage is applied on these gates or current pass through the coils, the electron beam can be focused or steered to certain degree.

Figure 11:
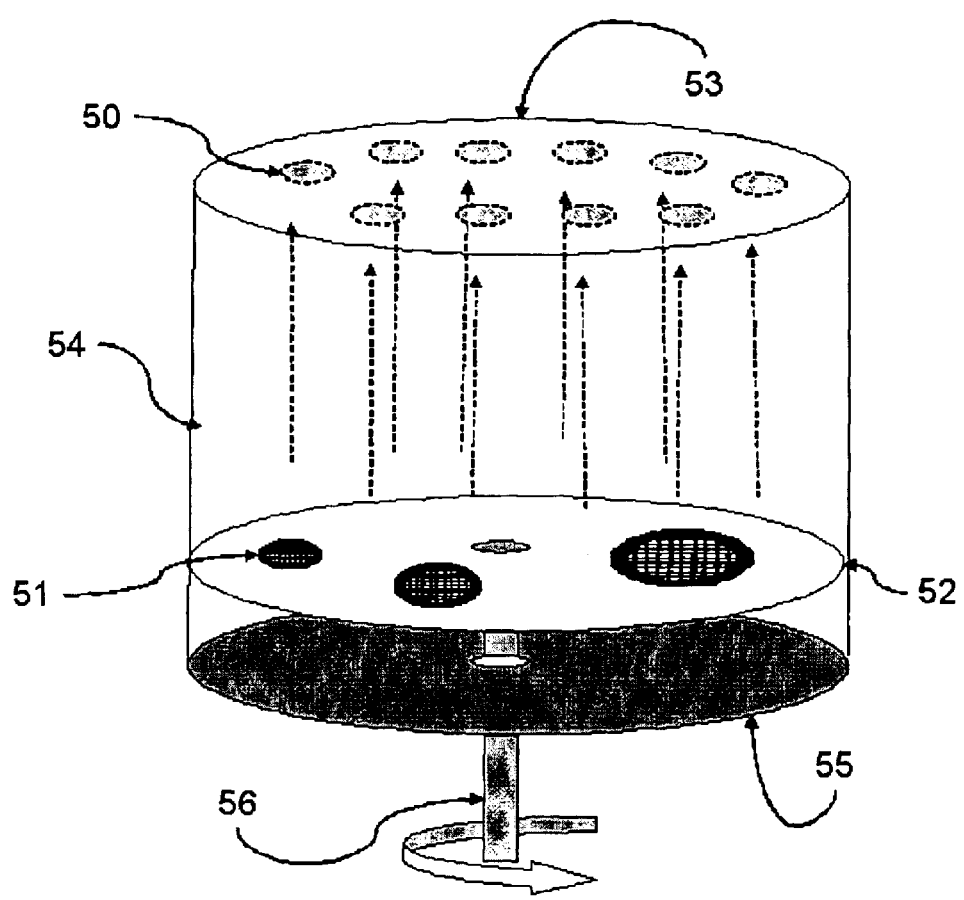
FIG. 11 is a schematic illustration of an alternative arrangement and technique including a rotating gate structure formed according to the principles of the present invention.

An alternative technique and arrangement formed according to the principles of the present invention is illustrated in FIG. 11.

In this embodiment the cathode 55 has a planar geometry and comprises an electron emissive material disposed on either the entire planar surface, or on parts thereof. A gate electrode 52 is placed parallel to and separate from the cathode 55 with a finite gap. An anode 53 is opposing and is separated from the cathode 55 by a finite gap distance and are both enveloped by vacuum chamber 54. The gate electrode 52 contains one or a plurality of openings which can have mesh grids 51 disposed therein, wherein the positions of the mesh grids 51 with respect to the cathode 55 can be arranged such that the a specific area or areas on the cathode can be selected as the emission pixel or pixels to produce field emitted electrons that are directed towards a specific location or locations on the anode 53. Electrons are extracted from an emission pixel when the applied an electrical field between the pixel and its corresponding controlling unit on the gate electrode 52 exceeds a threshold value. A high voltage is applied between the gate electrode and the anode. When an individual pixel is turned on, the electron beam is accelerated by the high tension to gain enough kinetic energy and bombard a corresponding point on the anode 53. The anode 53 could be made of any suitable material such as copper, tungsten, molybdenum, or an alloy of different metals. X-ray is produced from the anode at the point the electrons impinge (referring to as "focal point" thereafter).

The mesh grids 51 can be made of a material with high melting temperature such as tungsten, molybdenum or nickel etc. The size of the openings in the mesh influences the amount of emitted electron current passing therethrough. Thus, the layer the size of the mesh openings the more emitted electron passing through and impinging the anode, and visa versa Preferably, a plurality of mesh grids 51 are utilized. Each of the grids can be provided with the same mesh opening size. Alternatively, the mesh grids can be provided with different sized openings.

The mesh grids 51 can be in the form of independently addressable units. For example, each grid can be electrically addressed, or opened and closed, independently from the others.

The gate electrode 52 can rotate around the axis 56 at various speeds controlled by a motor unit. When the applied an electrical field between the said emission area(s) and its corresponding controlling unit on the gate electrode 52 exceeds a threshold value, electrons are extracted from emission area(s). During the rotation of the gate 52 at certain speed, the emission current can be generated from anywhere in the emission ring of the cathode. A scanning x-ray beam is generated from the corresponding spots 50 on the anode 53 in a continuous or pulsed mode depending on whether a continuous or pulsed electrical potential is applied between the selected mesh grid 51 and the cathode 55. As a result, for imaging purposes, x-ray beams from different viewing angles are realized. The rotation speed and the voltage pulsation applied on the electrode can be programmed and controlled by computer to be turned on in a sequence, in certain frequency, duty cycle, and/or dwell time.

The emitted-electron current of the device can be controlled by choosing mesh grids with different mesh opening sizes, the rotation speed of the gate electrode, and/or the frequency and dwell time of the pulsation applied on the mesh grids.

Figure 12:
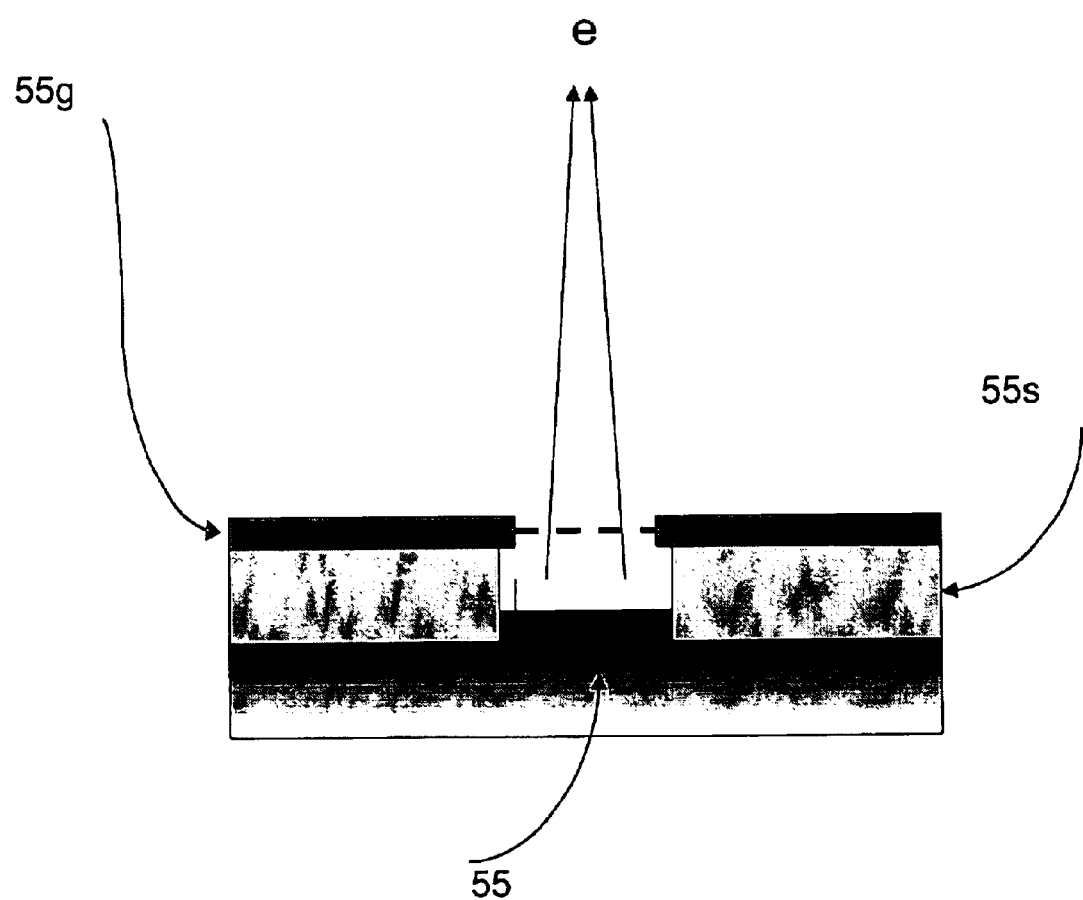
FIG. 12 is a schematic illustration of a gate electrode construction formed according to the present invention.

To control the electron beam extracted from each pixel, a gate construction can be used, such as the one illustrated in FIG. 12. One or more gates 55g may be provided which is separated by at least one insulating spacer 55s. A grid 51 may be incorporated into the gate 55g to selectively regulate the flow of emitted electrons therethrough.

Figure 13:
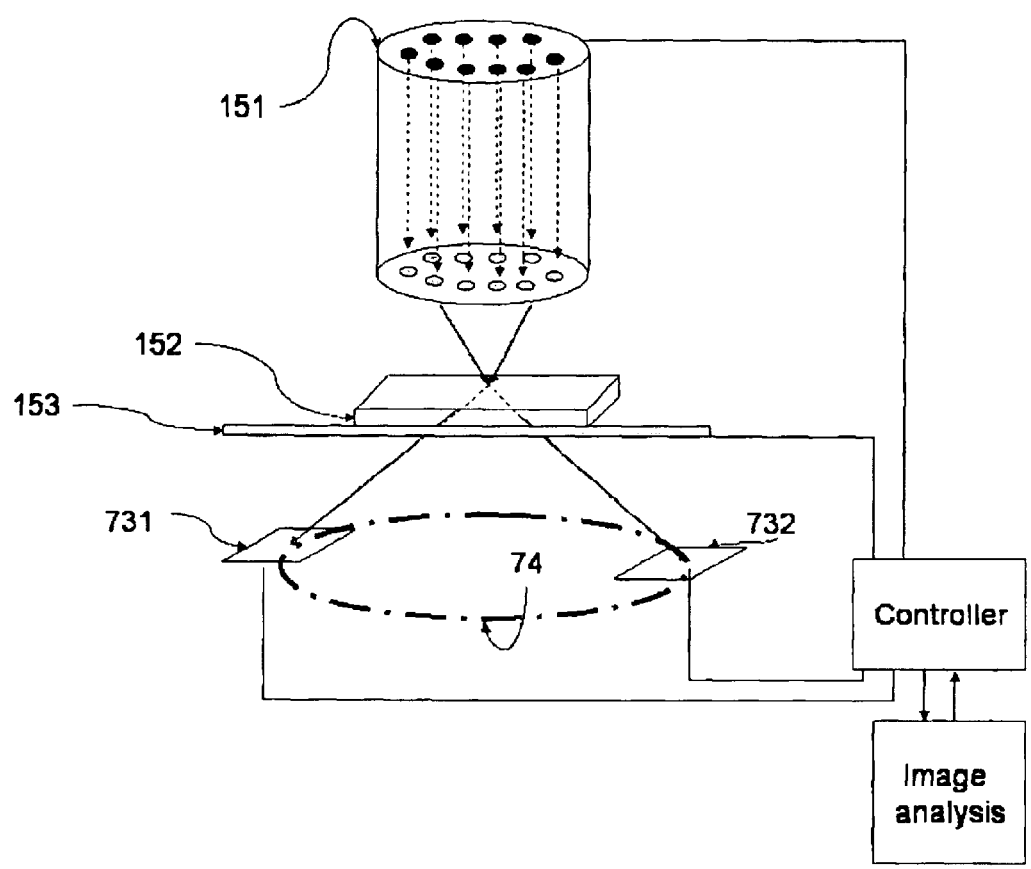
FIG. 13 is a schematic illustration of an inspection arrangement or system incorporating an x-ray source according to the present invention.

An exemplary embodiment of an x-ray inspection arrangement or system is illustrated in FIG. 13. The arrangement includes an x-ray source 151 constructed according to any of the previously-described embodiments. X-rays generated by the x-ray source 151 are directed onto the object under inspection 152, which can be located on a movable stage 153. When utilized, the stage 153 is preferably translatable in the x, y and z directions, and/or rotatable about a given axis.

An x-ray detector 74 is provided which may include an array of individual detectors 731, 732 at different locations. X-rays passing through the object 152 are received by the detector 74. Preferably, a controller is provided that can be utilized to control the movement of stage 153, and thereby position the object 152, as well as control operation and/or location of the detector(s) 74, 731, 732. An image analysis device may also be incorporated to receive, manipulate and/or output data from the detector 74.

Figure 14:
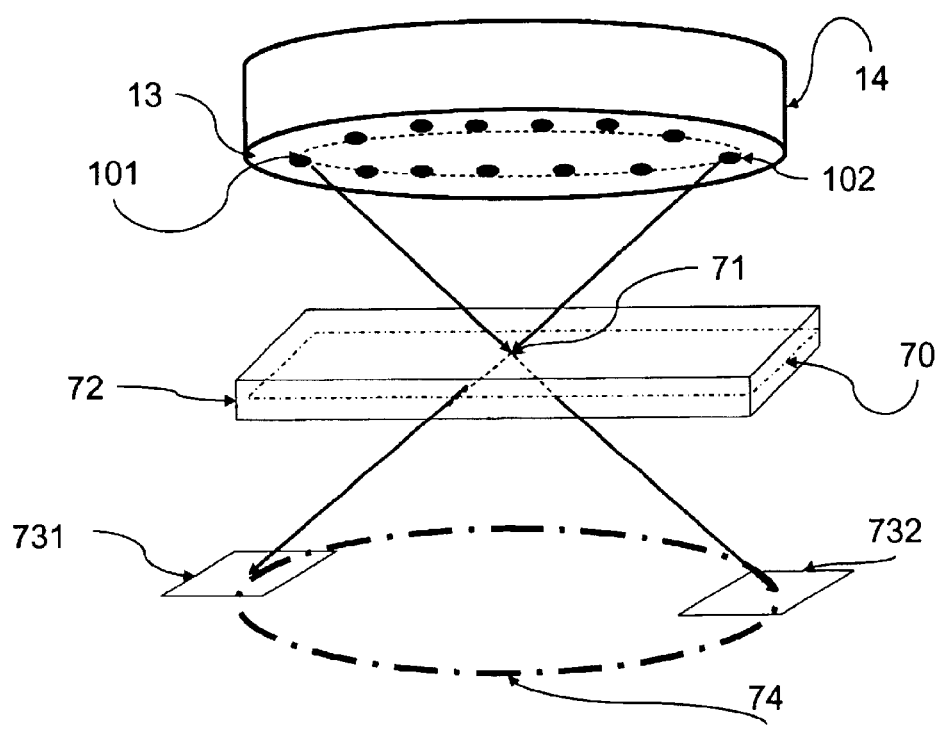
FIG. 14 is a schematic illustration of a further arrangement for providing multi-beam x-rays based on laminography, formed according to the principles of the present invention.

In another embodiment of the invention, an ultra-fast all stationary x-ray imaging and inspection technique and system is constructed utilizing the field emission multi-beam x-ray source. One version of this system is illustrated in FIG. 14. An object 72 to be inspected, e.g.—a circuit board 70, is placed between an x-ray source 14 and an x-ray detector 74. The x-ray source 14 is preferably the field emission multi-beam x-ray source disclosed herein. The x-ray detector 74 can be either an array of detectors 731, 732 placed at different locations on the same plane, or an area detector with a matrix of pixels. To collect the data, the x-ray source is turned on. All the electron emitting pixels on the cathode are turned on at the same time. Each pixel produces an electron beam that bombards on a corresponding focal spot 101, 102 on the anode 13 of the x-ray source. The x-ray generated from each focal spot on the anode 13 produces one image of the object from different angles which is recorded by a corresponding detector. For example, the x-ray beam generated from focal spot 101 produces one image of the object that is recorded by detector 732. The x-ray beam generated from focal point 102 produces one image of the object that is recorded by detector 731. In the case where a large area detector is used, 731 and 732 are specific regions of the area detector.

Since the different focal spots are located at different points of the anode, images of the object produced by the x-ray beams originated from the different focal spots have different projection angles relative to the object being imaged. Structures obscured from one projection angle can be revealed by the x-ray beam coming from a different focal spot and thus different viewing angle. By turning on all the electron-emitting pixels on the cathode, x-ray beams are generated from all the different focal spots at the same time, and therefore the different projection images of the same object can be collected at the same time. Optionally, all the projection images are displayed on a monitor. Further, the imaging and inspection system may comprise a computer and software to reconstruct an image which reveals the internal structure of the object under examination using the different projection images collected. Since all the projection images are collected at the same time, the system enables instantaneous reconstruction and display of an image which reveals the internal structure of the object. This is advantageous compared to other inspection systems where the different projection images have to be collected one at a time. The capability of the present invention can significantly increase the rate by which objects can be imaged.

According to an alternative embodiment, the x-ray beam from each pixel 101, 102 will produce an x-ray image of the plane 70 in the object 72 on the corresponding x-ray detector. The image plane 70 is the intersection area of the x-ray beams from each pixel 101, 102 of the x-ray source 14. During the operation, each of the pixels 101, 102 will be turned on to provide an x-ray beam from different directions respective to the scanned object. Thus, the x-ray images of the object from different angles will be recorded by the corresponding x-ray detectors. This information will be further used to reconstruct a 2-D or 3-D image. During the reconstruction of the collected image data, structure in the object 72 which is outside of the scanned plan 70 will produce a blurred image on the detectors 731, 732 while the structure on the scanned plane 70 will form a sharp image. A different plane can be selected for examination by changing the location at which the x-ray beams intersect within the object 72. This can be accomplished by moving the object 72 relative to the x-ray source 14, or changing the angle at which the x-rays are incident upon the object 72 by moving the pixels 101, 102.

In one particular mode of operation of this system, all the pixels can be turned on at the same time. The detector array will be arranged and programmed in such a way that different regions of the detector array 731, 732 will only collect x-ray signals from one corresponding pixel 101, 102 of the x-ray source 14. For example, region 732 of the detector array will only collect the x-rays from the particular pixel 101 and region 731 will only collect the x-rays from the pixel 102. When all the pixels are programmed to be turned on at once, the detectors will collect all of the x-ray images of the scan plane simultaneously, so an x-ray image can be obtained instantly. This imaging geometry is shown in FIG. 14.

According to another embodiment of this invention, the x-ray source 14 is turned on to collect data. All the electron emitting pixels on the cathode are turned on in a programmable sequence, therefore one or multiple pixels, but not all pixels, are turned on at one time. Each pixel produces an electron beam that bombards on a corresponding focal spot 101, 102 on the anode 13 of the x-ray source 14. The x-ray generated from each focal spot on the anode produces one image of the object from different angles which is recorded by a corresponding detector. The x-ray detector 74 can be constructed and operate as described above. For example, when the x-ray beam is generated from focal spot 101, the image of the object is recorded by detector 732, when the x-ray beam is generated from focal point 102, the image of the object therefore is recorded by detector 731. Detector 731 and detector 732 could be different detectors, different regions of a detector array, or they could be the same detector which is positioned at different places. Since the different focal spots are located at different points of the anode 13, images of the object produced by the x-ray beams originated from the different focal spots have different projection angles. Structures obscured from one projection angle can be revealed by the x-ray beam coming from a different focal spot and thus different viewing angle. By turning on different electron-emitting pixels on the cathode, x-ray beams are generated from all the different focal spots and therefore different projection images of the same object can be collected.

Figure 15:
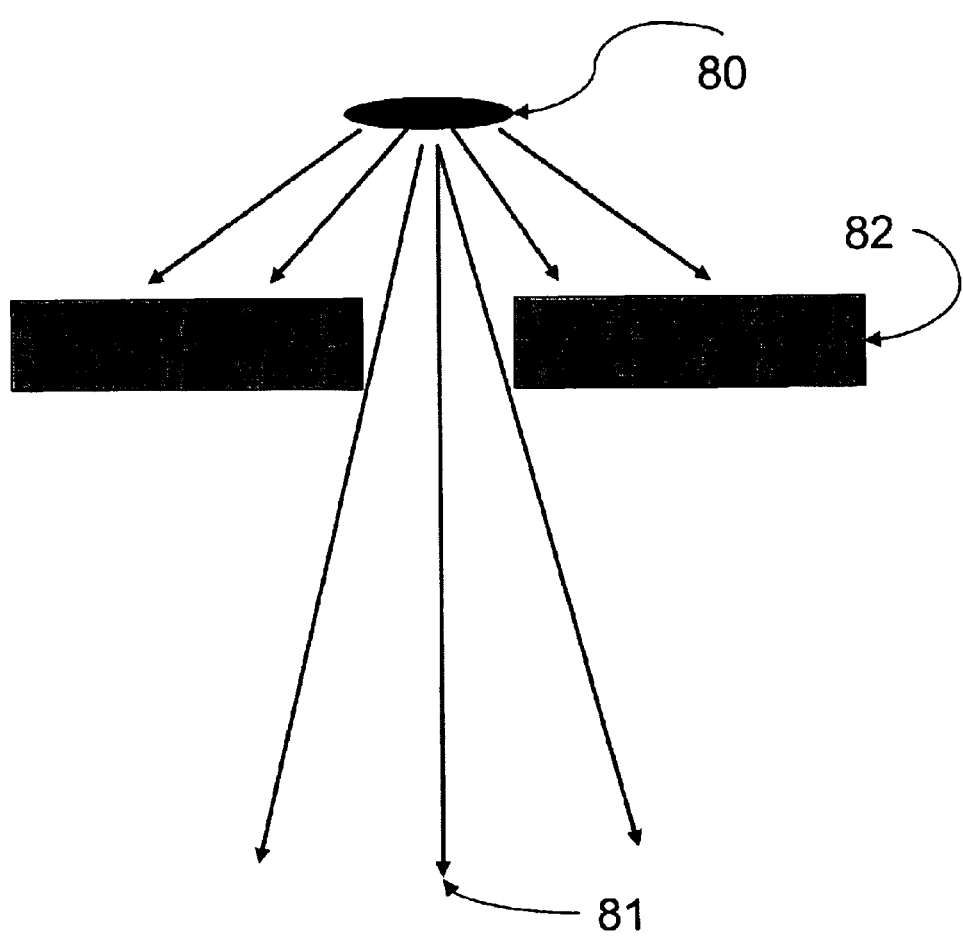
FIG. 15 is a schematic illustration of an x-ray collimator device which may be utilized with various constructions and techniques performed according to the principles of the present invention.

According to an alternative, the system may further comprise a collimator 82 or a group of collimators, as shown in FIG. 15, to define the spread angle of the x-ray fan beam 81 with certain spread angle from each focal spot 80. The collimator(s) 82 are designed such that the x-ray beam from each focal spot on the anode illuminates only the area to be imaged, and such that the x-ray photons originated from a focal spot reaches only the corresponding detector.

While the present invention has been described by reference to the above-mentioned embodiments, certain modifications and variations will be evident to those of ordinary skill in the art. Therefore, the present invention is limited only by the scope and spirit of the appended claims.

We claim:

1. A multi-beam x-ray generating device comprising:
a stationary field-emission cathode comprising a plurality of stationary and individually controllable electron-emitting pixels disposed in a predetermined pattern on the cathode;
an anode opposing the cathode comprising a plurality of focal spots disposed in a predetermined pattern that corresponds to the predetermined pattern of the pixels; and
a vacuum chamber enveloping the anode and cathode,
wherein the plurality of pixels comprise at least one pixel having a first emission area and at least one pixel having a second emission area, wherein the first emission area is larger than the second emission area.

2. The device of claim 1, wherein the cathode comprises a nanostructure-containing material.

3. The device of claim 2, wherein the nanostructure-containing material comprises single walled carbon nanotubes.

4. The device of claim 1, wherein the cathode has a planar geometry.

5. The device of claim 4, wherein the anode has a planar geometry.

6. The device of claim 1, further comprising at least one gate electrode arranged to control the field-emission cathode.

7. The device of claim 6, wherein the at least one gate electrode comprises a plurality of individually addressable gate electrode control units, each unit arranged to control a corresponding electron-emitting pixel.

8. The device of claim 1, wherein the focal spots comprise materials that produce x-rays with different energy distributions when bombarded with electrons emitted from the pixels.

9. The device of claim 1, comprising one focal spot for every pixel.

10. The device of claim 1, further comprising a computer programmed to control the plurality of pixels.

11. The device of claim 10, wherein the computer is programmed to turn on the pixels in sequence, at a predetermined frequency, for a predetermined duty cycle, and/or for a predetermined dwell time.

12. The device of claim 1, wherein the pixels and corresponding focal spots are arranged along the circumference of a circle.

13. The device of claim 1, wherein the pixels and corresponding focal spots are arranged along the circumferences of a plurality of concentric circles.

14. The device of claim 1, wherein the pixels are arranged in at least one cluster, the at least one cluster comprising a plurality of immediately adjacent pixels.

15. The device of claim 1, wherein each pixel comprises a multi-layer electrical gate or coil constructed to focus a beam of electrons emitted from each pixel.

16. The device of claim 1, further comprising a collimator constructed to focus the x-ray beams generated by the focal spots.

17. The device of claim 1, further comprising an x-ray detector.

18. The device of claim 17, wherein the detector comprises a plurality of discrete detector elements.

19. The device of claim 17, wherein the detector comprises a matrix of detector pixels.

20. The device of claim 17, further comprising computer hardware and software for collecting input from the detector, and constructing an image from the input.

21. The device of claim 20, further comprising a monitor for displaying the image.

22. An x-ray generating device comprising:
a stationary field-emission cathode, the cathode comprising a planar surface with an electron-emissive material disposed on at least a portion thereof;
a gate electrode disposed in parallel spaced relationship relative to the planar surface of the cathode, the gate electrode comprising a plurality of openings having different sizes;
an anode opposing the cathode and spaced therefrom, the anode comprising a plurality of focal spots aligned with the electron-emissive material;
a vacuum chamber enveloping the anode and cathode; and
a controlling unit for operating the gate electrode such that the openings are manipulated to bring at least one beam of electrons emitted from the cathode into and out of registry with at least one of the focal spots.

23. The device of claim 22, wherein the openings comprise a plurality of mesh grids.

24. The device of claim 23, wherein the mesh grids are formed from tungsten, molybdenum, nickel, or alloys thereof.

25. The device of claim 23, wherein each of the mesh grids can be electrically and independently controlled.

26. The device of claim 22, wherein the gate electrode is rotatable.

27. The device of claim 26, further comprising a computer programmed to control the speed at which the gate electrode is rotated, a voltage applied to the gate electrode, a sequence of focal spots brought into registry with electrons emitted from the cathode, and/or the amount of time that the emitted electrons are allowed to remain in registry with a particular focal spot.

28. The device of claim 22, wherein the cathode comprises a nanostructure-containing material.

29. The device of claim 22, wherein the nanostructure-containing material comprises single walled carbon nanotubes.

30. A method of scanning an object with x-rays directed at the object from different locations, the method comprising:
(i) providing a stationary field-emission cathode comprising a plurality of stationary and individually controllable electron-emitting pixels and disposing the pixels in a predetermined pattern on the cathode;
(ii) locating an anode in opposing relationship to the cathode and providing the anode with a plurality of focal spots disposed in a predetermined pattern that corresponds to the predetermined pattern of the pixels;
(iii) enveloping the anode and cathode with a vacuum chamber; and
(iv) activating at least one of the pixels thereby generating a beam of emitted electrons that is incident upon a corresponding focal spot of the anode, thereby generating an x-ray, and directing the x-ray toward the object to be scanned,
wherein step (i) comprises providing at least one pixel having a first emission area and providing at least one pixel having a second emission area, wherein the first emission area is larger than the second emission area.

31. The method of claim 30, wherein step (iv) comprises activating a first pixel thereby generating a first x-ray incident upon the object to be scanned from a first location, then sequentially activating at least a second pixel thereby generating a second x-ray incident upon the object to be scanned from a second location.

32. The method of claim 30, wherein step (iv) comprises simultaneously activating a plurality of pixels thereby generating a plurality of x-rays incident upon the object to be scanned from multiple locations.

33. The method of claim 30, further comprising the step of:

(v) locating an x-ray detector such that x-rays passing through the object being scanned are incident up the detector.

34. The method of claim 33, wherein the detector comprises a plurality of discrete detectors.

35. The method of claim 33, wherein the detector comprises an array of detector pixels.

36. The method of claim 33, further comprising the step of:

(vi) collecting input from the detector and constructing an image from the input.

37. The method of claim 36, further comprising the step of:

(vii) displaying the constructed image.

38. The method of claim 30, wherein the cathode comprises a nanostructure-containing material.

39. The method of claim 38, wherein the nanostructure-containing material comprises single walled carbon nanotubes.

40. The method of claim 30, wherein steps (i) and (ii) comprise arranging the pixels and corresponding focal spots along the circumference of a circle.

41. The method of claim 30, wherein steps (i) and (ii) comprise arranging the pixels along the circumferences of a plurality of concentric circles.

42. The method of claim 30, wherein step (i) comprises arranging the pixels in at least one cluster, the at least one cluster comprising a plurality of immediately adjacent pixels.

43. A method of scanning an object with x-rays directed at the object from different locations, the method comprising:

(i) providing a stationary field-emission cathode comprising a planar surface, and providing an electron emissive material on at least a portion of the planar surface;

(ii) disposing a gate electrode in parallel spaced relationship relative to the planar surface of the cathode, and providing the gate electrode with a plurality of openings having different sizes;

(iii) locating an anode in opposing relationship to the cathode and providing the anode with a plurality of focal spots aligned with the electron-emissive material;

(iv) enveloping the anode and the cathode in a vacuum chamber; and (v) manipulating the gate electrode to bring at least one beam of electrons emitted from the cathode into and out of registry with at least one of the focal spots.

44. The method of claim 43, wherein the openings in the gate electrode comprise a plurality of mesh grids.

45. The method of claim 44, wherein the mesh grids are formed from tungsten, molybdenum, nickel, or alloys thereof.

46. The method of claim 43, wherein step (v) comprises rotating the gate electrode to bring the at least one beam of emitted electrons into and out of registry with the at least one focal spot.

47. The method of claim 43, wherein step (ii) further comprises independently opening and closing the openings of the gate electrode.

48. The method of claim 43, further comprising the step of:

(vi) controlling the operation of the gate electrode with a computer.

49. The method of claim 48, wherein step (v) comprises rotating the gate electrode, and step (vi) comprises controlling the speed of rotation of the gate electrode, controlling a voltage applied to the gate electrode, controlling the sequence of focal spots brought into registry with electrons emitted from the cathode, and/or controlling the amount of time that the emitted electrons are allowed to remain in registry with a particular focal spot.

50. The method of claim 43, wherein the cathode comprises a nanostructure-containing material.

51. The method of claim 50, wherein the nanostructure-containing material comprises single walled carbon nanotubes.

* * * * *